June 14, 1927.
A. F. MASURY ET AL
1,631,975
MULTIWHEEL DRIVE FOR VEHICLES
Filed Sept. 26, 1925   2 Sheets-Sheet 1
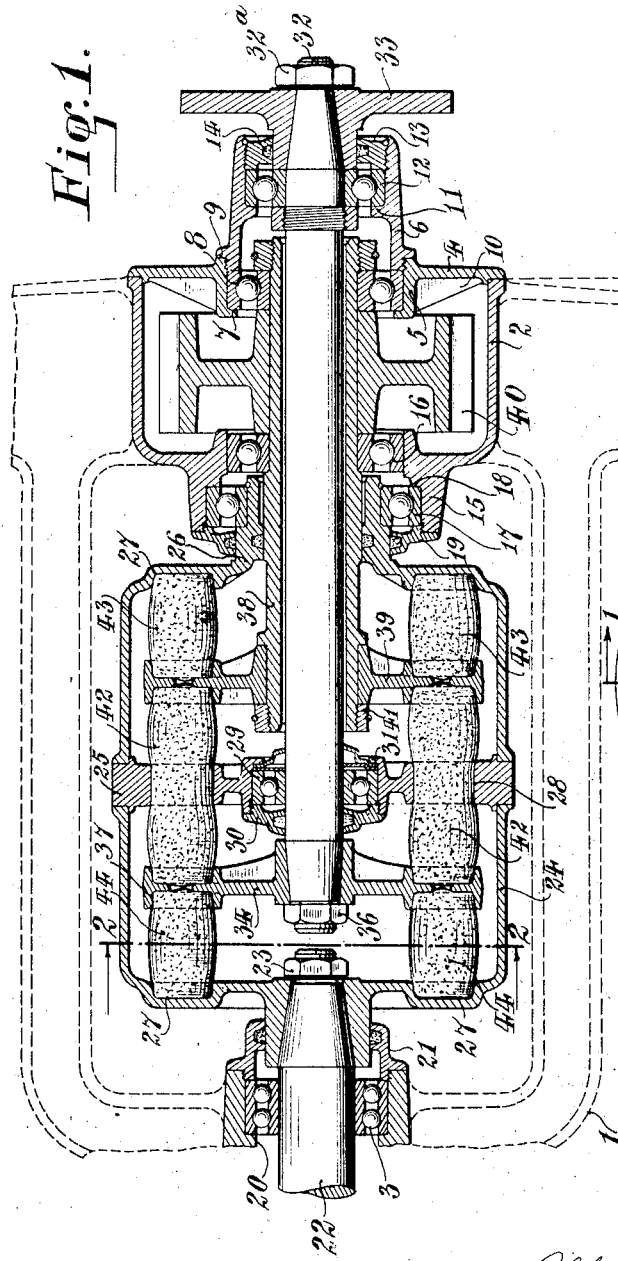
Inventors
Alfred F. Masury & Charles Froesch
By their Attorneys
Redding, Greeley, O'Shea & Campbell.

June 14, 1927.  
A. F. MASURY ET AL  
MULTIWHEEL DRIVE FOR VEHICLES  
Filed Sept. 26, 1925    2 Sheets-Sheet 2
1,631,975
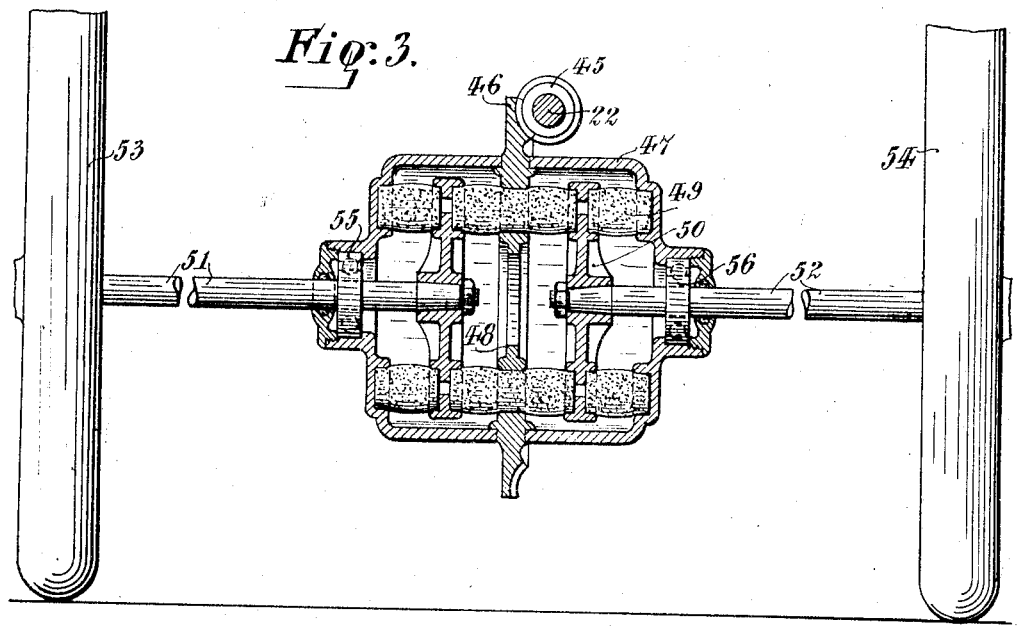
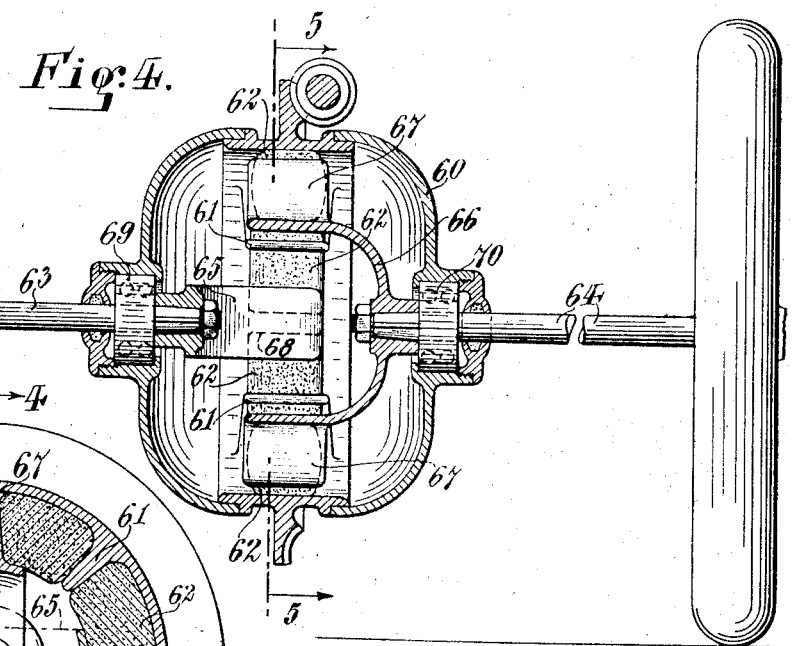
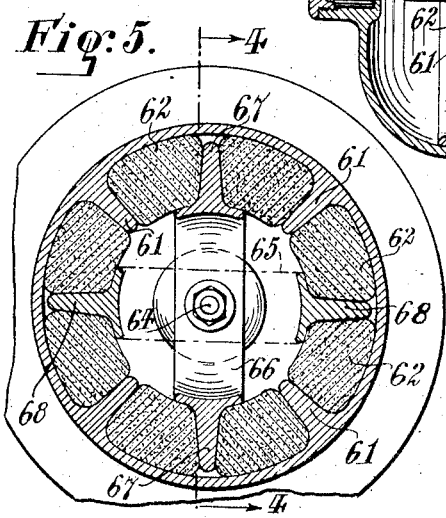
INVENTORS  
Alfred F. Masury and Charles French  
BY Redding, Greeley, O'Shea and Campbell  
ATTORNEYS Patented June 14, 1927.

1,631,975

UNITED STATES PATENT OFFICE.

ALFRED F. MASURY AND CHARLES FROESCH, OF NEW YORK, N. Y., ASSIGNORS TO INTERNATIONAL MOTOR COMPANY, OF NEW YORK, N. Y., A CORPORATION OF DELAWARE.

MULTIWHEEL DRIVE FOR VEHICLES.

Application filed September 26, 1925. Serial No. 58,738.

The invention relates to drives for multiwheel vehicles wherein a plurality of pairs of shafts are driven through a power apportioning device which avoids the use of a complete differentiating driving connection between the inter-related shafts and supplies cushioning elements to absorb strains and stresses and minimize vibrations.

Although the mechanical differential devices apportion the power between the shafts, they are inflexible and fail to absorb shocks and strains due to driving and braking. The present device provides a device capable of supplying this impositive drive and of absorbing the above mentioned shocks.

Its application extends to all types of vehicles and of any number of driving wheels and may be disposed at any suitable point in the driving mechanism, such as for example, on the chassis as part of the sprung weight, or ahead, between or behind a set of driving axles.

The present invention is an improvement on the device shown in copending application No. 46,695, wherein the rubber connecting members transmit power under compression. In the present device the rubber blocks transmit power under compression, shear and torsion and a more impositive connection is obtained.

Other objects of the invention and possible variations of the structure will appear as the description proceeds, reference now being had to the accompanying drawings for a detailed description, wherein:

Figure 1 is a section taken on the line 1—1 of Figure 2 through the longitudinal axis of the device and showing the construction of the power apportioning device.

Figure 2 is a section on the line 2—2 of Figure 1 and looking in the direction of the arrows, showing the spacing of the rubber blocks between the driving and driven members.

Figure 3 shows a modification of the invention wherein the apportioning means applies power to the jack shafts and rear wheels of an automobile.

Figure 4 shows still another modification as applied to oppositely extending jack shafts.

Figure 5 is a sectional view on lines 5—5 of Figure 4 and looking in the direction of the arrows.

Referring more particularly to Figure 1, it will be seen that the structure supporting the device to the frame of the vehicle is shown in dotted lines as at 1. This support is provided with a housing 2 at one end for enclosing the take-off mechanism of one branch of the dividing means and at the other end with a bearing 3 for supporting the propeller shaft 22. The housing 2 is provided with a removable face plate 4 which, in turn, has a flanged portion 5 supporting a collar 6. On the inner end of the flange 5 is provided a throat member 7 and between this member and the collar 6 is positioned the ball race 8. Collar 6 is provided with a flange 9 so spaced from the end that when the collar is abutting the race 8, the flange will be abutting the outer end of the flange 5. The collar 6 may be screwed into the flange 5 by suitable threads. The flange 5 may be strengthened by suitable webs 10.

Collar 6 is further provided with a throat 11 in its outer end against which may abut the ball race of bearing 12 which supports the transmission shaft 32. Screwed into the outer end of the collar is a nut 13 which secures the ball race in place and may provide a packing 14 for the shaft 32. The face plate 4 may be bolted or otherwise secured to the housing 2.

The other side of the housing 2 is provided with a stepped flange 15, the inner portion of which supports the ball race of bearing 16 and the outer portion of which supports the race of bearing 17, the latter being held against shoulder 18 by the unit 19 which screws into the outer end of the flange 15. In addition, nut 19 provides a packing for collar 26 of housing 24.

Bearing 3 is secured against the abutment 20 by shouldered tap 21 which also provides a packing for the propeller shaft 22, which is supported in the bearing 3.

Secured to the propeller shaft 22 by nut 23 is a housing 24 which is provided with a central transverse partition 25 and a collar 26 at its other end. The collar 26 is supported by the bearing 17 in the flange 15 of housing 2. Disposed on opposite transverse walls of housing 24 are sockets 27 adapted to receive suitable rubber blocks. The transverse partition 25 is provided with apertures 28 spaced in line between the sockets 27 in the end walls of housing 24. In the central aperture of partition 25 a bearing 29 is secured by a nut 30 holding it against throat 31.

Supported in bearings 29 and 12 is transmission shaft 32 which, at one end, has secured thereto one element 33 of a universal joint and at the other end a disc member 34. These may be secured by suitable bolts 32ª and 36 respectively. This shaft 32 forms one element of a take-off means from the power apportioning system.

The flange 34 may be suitably reenforced by webs 35 and is provided on opposite sides with sockets 37 (see Figure 2) spaced near the periphery of the disc and in line between the corresponding sockets 27 and aperture 28.

Around the shaft 32 and within the collar 26 of the housing 24 is provided a sleeve 38 which has a disc 39, similar in all respects to disc 34, secured to it at one end and a suitable take-off means such as a spur gear 40 secured at its other end. This sleeve forms one element of the other take-off means from the power apportioning system and is journaled in the bearings 16 and 8. Spur gear 40 may drive a transmission shaft to a second pair of drive wheels in any well known manner and disc 39 may be secured to sleeve 38 by a suitable nut 41.

Positioned within the apertures 28 of partition 25 and engaging corresponding opposed sockets 37 of the discs 34 and 39 are rubber blocks 42. Positioned between the corresponding sockets on the opposite sides of the discs and the respective sockets 27 in the end walls of the housing 24 are rubber blocks 43 and 44 at the respective ends of the housing 24.

From the above description it will be seen that power is transmitted from propeller shaft 22 to housing 24. From housing 24 it is divided to either of the take-off means, sleeve or shaft 38 or 32 respectively as follows. From housing 24 through partition 25 and an end of the housing, rubber blocks 42 and 43, discs 39 to sleeve 38, or from housing 24 through partition 25 and the other end of the housing, rubber blocks 42 and 44, disc 34 to shaft 32. The transmission of power through the rubber blocks will be accompanied by a compressional and torsional, as well as a shearing stress in these blocks and the absorption of these stresses by the blocks has been found to provide an exceptionally smooth and improved apportioning of power to the respective driving members. By placing the blocks 42, 43 and 44 under compression when assembling the device, it has been found to increase their serviceability and give them additional life.

Figure 3 shows the device applied to oppositely extending jack shafts. 45 represents a worm or other suitable means of taking off power from the shaft 22, and 46 the worm wheel on the housing 47 and constituting the other element of the final drive. The housing has a central partition 48 similar to Figure 1 and rubber blocks 49. Discs 50 are connected through these blocks to the housing and are secured to jack shafts 51 and 52 which in turn drive their respective wheels 53 and 54. Bearings 55 and 56 are provided in each end of the housing and the shafts are carried in these bearings.

In Figures 4 and 5 the housing 60 is driven in a manner similar to that of Figure 3. Inwardly projecting flanges 61 serve as seats for rubber blocks 62. Jack shafts 63 and 64 carry spiders 65 and 66, which in turn have flanges 67 and 68 forming seats cooperating with seats 61 for the rubber blocks 62. Bearings 69 and 70 are provided for the shafts as in Figure 3.

It should be noted that the invention is not limited to a particular type of motor vehicle but may be adapted to any desired type of drive. For example, power may be divided out from both ends of the device to be transmitted to both front and rear wheels, or the device may be disposed between two driving axles, or it may be disposed rearwardly instead of forwardly of the driving axles. It is also evident that it is not limited in its application to the dividing out of two separate sources of power, but may be used to apportion power to any number of driving members.

What we claim is:

1. In a vehicle having a plurality of pairs of driving wheels, driving means for the pairs, non-metallic yielding means for apportioning power between said pairs, and means to mount the yielding means to transmit power under torsion.

2. In a vehicle having a plurality of pairs of driving wheels, yielding means for driving individual pairs, and means to mount the driving means to transmit power under torsion, the driving means being concentrically mounted about a common axis.

3. In a power apportioning means, a housing and means to rotate the same, a central partition carried by the housing, driven means, and means mounted between the driven means and the partition and the housing walls to transmit power to the driven means.

4. In a power apportioning means, a housing and means to rotate the same, a central partition carried by the housing, driven means, and means mounted between the driven means and the partition and the housing walls to transmit power under torsion to the driven means.

5. In a power apportioning device, a housing and means to rotate the same, concentrically mounted driven means extending into the housing, means carried by the ends of the concentric means for receiving apportioned power, and means mounted between the housing ends and the respective power receiving means for apportioning power therebetween.

6. In a power apportioning device, a housing and means to rotate the same, concentrically mounted driven means extending into the housing, means carried by the ends of the concentric means for receiving apportioned power, and means mounted between the housing ends and the respective power receiving means for apportioning power under torsion therebetween.

7. In a power apportioning device, a housing and means to rotate the same, a partition mounted centrally within the housing and providing a bearing, concentrically mounted driven members extending into the housing, the end of the inner member being journaled in the bearing, discs mounted on the ends of the driven members, one being on one side and the other on the other side of the partition, and means mounted between the respective discs and the partition and end walls for apportioning power between the driven members.

8. In a power apportioning device, a housing and means to rotate the same, a partition mounted centrally within the housing and providing a bearing, concentrically mounted driven members extending into the housing, the end of the inner member being journaled in the bearing, discs mounted on the ends of the driven members, one being on one side and the other on the other side of the partition, and means mounted between the respective discs and the partition and end walls for apportioning power under torsion between the driven members.

9. In a power apportioning device, a housing and means to rotate the same, a partition mounted centrally within the housing and providing a bearing, concentrically mounted driven members extending into the housing, the end of the inner member being journaled in the bearing, discs mounted on the ends of the driven members, one being on one side and the other on the other side of the partition, sockets spaced radially about the ends of the housing in opposed relation, corresponding sockets upon opposite sides of each disc in line with the first mentioned sockets, apertures in the partition correspondingly spaced with the sockets and in line therewith, rubber columns in the apertures and fitted into opposed sockets on the respective discs, and rubber columns fitted between the sockets on the other side of the discs and the sockets in the respective end walls.

10. In a power apportioning device, a frame mounted on the chassis of a motor vehicle, the frame having a longitudinal yoke shaped extension, a bearing in the bight of the yoke and a propeller shaft journaled therein, a housing journaled therein, a housing formed in the frame between the legs of the yoke, a face plate for one side of the housing and forming a closure for the same, a rotatable housing secured at one end to the propeller shaft within the yoke, means for journaling the other end of the rotatable housing within the housing in the frame, concentric driven means extending into the housing, means within the housing to apportion power from the housing therebetween, bearing means in the housing and face plate for supporting the outer of the members, means mounted upon the said member within the housing for taking off power therefrom, bearing means secured to the face plate beyond the outer bearing means for supporting the inner member and means secured to the end of the inner member to take off power therefrom.

11. In a vehicle, a propeller shaft, jack shafts, a housing, means carried by the housing and operable between the same and the respective jack shafts comprising yielding, nonmetallic means for apportioning power between the respective jack shafts and a final drive between the propeller shaft and the housing.

12. In a power apportioning means, a housing and means to rotate the same, jack shafts extending into the housing, means carried by the ends of the jack shafts for receiving apportioned power, and means mounted between the housing ends and the respective power receiving means for apportioning power therebetween.

13. In a power apportioning device, a housing and means to rotate the same, a partition mounted centrally within the housing, jack shafts extending into the housing, discs mounted on the ends of the jack shafts, one being on one side and the other on the other side of the partition, and means mounted between the respective discs and the partition and end walls for apportioning power to the jack shafts.

This specification signed this 18th day of September A. D. 1925.

ALFRED F. MASURY.
CHARLES FROESCH.